United States Patent
Liu et al.

(10) Patent No.: US 9,790,376 B2
(45) Date of Patent: Oct. 17, 2017

(54) ANTIMICROBIAL POLYMER EMULSION WITH IMPROVED COLOR STABILITY

(71) Applicant: Rohm and Haas Company, Philadelphia, PA (US)

(72) Inventors: Han Liu, Shanghai (CN); Xiangting Dong, Shanghai (CN); Qingwei Zhang, Shanghai (CN); Tao Wang, Shanghai (CN)

(73) Assignee: Rohm and Haas Company, Collegeville, PA (US)

( * ) Notice: Subject to any disclaimer, the term of this patent is extended or adjusted under 35 U.S.C. 154(b) by 0 days.

(21) Appl. No.: 15/101,456

(22) PCT Filed: Dec. 25, 2013

(86) PCT No.: PCT/CN2013/090406
§ 371 (c)(1),
(2) Date: Jun. 3, 2016

(87) PCT Pub. No.: WO2015/096055
PCT Pub. Date: Jul. 2, 2015

(65) Prior Publication Data
US 2016/0304723 A1 Oct. 20, 2016

(51) Int. Cl.
| | |
|---|---|
| *C09D 5/16* | (2006.01) |
| *C08G 61/02* | (2006.01) |
| *C08G 61/04* | (2006.01) |
| *C09D 5/14* | (2006.01) |
| *C08L 33/06* | (2006.01) |
| *C09D 133/06* | (2006.01) |
| *C09J 133/06* | (2006.01) |
| *C09D 179/06* | (2006.01) |
| *C09D 5/02* | (2006.01) |
| *C08F 4/40* | (2006.01) |

(52) U.S. Cl.
CPC .............. *C09D 5/14* (2013.01); *C08L 33/06* (2013.01); *C09D 5/025* (2013.01); *C09D 133/06* (2013.01); *C09D 179/06* (2013.01); *C09J 133/06* (2013.01); *C08F 4/40* (2013.01)

(58) Field of Classification Search
CPC ...... C09D 5/14; C09D 179/06; C09D 133/06; C09J 133/06; C08L 33/06; C08L 79/06; C08F 4/40; C08F 220/14; C08F 220/06; C08F 2220/1825; C08F 220/56

USPC ............................................... 523/122; 520/1
See application file for complete search history.

(56) References Cited

U.S. PATENT DOCUMENTS

| | | | |
|---|---|---|---|
| 5,385,960 A | 1/1995 | Emmons et al. | |
| 6,635,725 B1 | 10/2003 | Sata | |
| 7,645,824 B2 * | 1/2010 | Hendriks | A01N 25/34 523/122 |
| 2004/0002557 A1 | 1/2004 | Qian | |
| 2004/0077748 A1 * | 4/2004 | Angel | A01N 59/16 523/122 |
| 2004/0258648 A1 * | 12/2004 | Creamer | A61K 8/8158 424/70.16 |
| 2005/0171235 A1 | 8/2005 | Harren et al. | |
| 2005/0265931 A1 * | 12/2005 | Qian | A61K 6/0017 424/49 |
| 2006/0156948 A1 | 7/2006 | Hendriks et al. | |
| 2007/0238807 A1 * | 10/2007 | Safir | A61K 8/8135 523/113 |
| 2008/0242794 A1 * | 10/2008 | Sandford | A01N 59/16 524/515 |
| 2011/0243882 A1 * | 10/2011 | Dong | A01N 59/16 424/78.31 |
| 2014/0170238 A1 * | 6/2014 | Cliff | C09D 5/14 424/618 |

FOREIGN PATENT DOCUMENTS

| | | |
|---|---|---|
| EP | 2371221 A2 | 10/2011 |
| GB | 2268063 A | 1/1994 |
| WO | 2006051028 A1 | 5/2006 |

* cited by examiner

*Primary Examiner* — Jessica E Whiteley
(74) *Attorney, Agent, or Firm* — Karl E. Stauss; Cantor Colburn LLP

(57) ABSTRACT

Provided is a process for forming an antimicrobial polymer composition comprising: contacting together at least one initiator, at least one promoter, at least one reductant, and at least one monomer, under emulsion polymerization conditions to form a base polymer; and mixing with the base polymer an antimicrobial complex; wherein the at least one initiator is a peroxidic compound and the at least one reductant is an ascorbic compound.

8 Claims, No Drawings

ANTIMICROBIAL POLYMER EMULSION WITH IMPROVED COLOR STABILITY

FIELD OF THE INVENTION

The present invention relates to a process for forming aqueous compositions of antimicrobial polymer emulsion, and coating compositions made therefrom, with improved color stability when exposed to heat or sun light.

BACKGROUND OF THE INVENTION

Certain metals, such as silver, have been known to be effective antimicrobial agents. Generally, an antimicrobial metal can be combined with certain polymer, such as polyester, to form an antimicrobial complex. This antimicrobial complex can then be mixed into another polymer, i.e., a base polymer, to form a combined antimicrobial polymer composition. Finally, such antimicrobial polymer composition can be incorporated into coating, paint, and plastics products for hygiene and medical device applications.

Conventional antimicrobial polymer compositions have one shortcoming, however. While it is well known that a polymer composition containing the aforementioned metal-based antimicrobial complex provide excellent anti-bacterial properties, when products containing the antimicrobial polymer composition comes in contact with heat or light, it often change color.

The point in time when discoloration of an antimicrobial polymer composition containing a metal-based antimicrobial complex appears can range from early in the manufacturing process, to late in a finished article's useful life. For example, discoloration of the antimicrobial polymer can occur right after mixing the metal-based antimicrobial polymeric additive with the base polymer composition. Likewise, discoloration can occur due to photo-instability resulting from short or long term exposure to high-energy radiation such as ultraviolet (UV) radiation from sunlight.

There had been a number of efforts to overcome this discoloration problem. These efforts, however, exhibit various limitations or are overly complex.

For example, WO2006051028 discloses a process of preventing discoloration of antimicrobial polymer compositions during exposure to sun light by adding a UV-absorber or a mixture of UV-absorbers. In particular, the disclosed process describes first forming a base polymer composition by mixing a monomer, such as an acrylic or methacrylic acid derivative, with a lauroylperoxide initiator. Thereafter, a common UV-absorber or a mixture of UV-absorbers, such as hydroxybenzophenone, 2-hydroxyphenylbenzotriazole, 2-hydroxypheyltriazine, and oxanilide, is added to the base polymer before adding the antimicrobial polymeric complex.

In another example, U.S. Patent Publication No. US2008/0242794 discloses adding a color stabilizer, such as a bromated or iodate ion, to a thermal-initiated polymer composition containing a silver-based antimicrobial polymeric complex. The disclosure also describes a process of preparing such a polymer composition by either mixing the color stabilizer with the base polymer composition before adding the silver-based antimicrobial polymeric complex, or compounding the color stabilizer with the base polymer simultaneously with the addition of the silver-based antimicrobial agent.

Some even proposed reducing discoloration by simply combining a silver-based antimicrobial agent with other metals, in hopes of lowering the total amount of silver in a given formulation. For example, U.S. Patent Application No. US20060156948A1 describes mixing copper with silver in the antimicrobial polymeric complex to lower the level of silver ion, knowing that copper is a less reactive but also a less potent antimicrobial metal.

In sum, the existing efforts appeared in the art for solving the discoloration problem in antimicrobial polymers, such as the ones mentioned above, have been limited to either reducing the amount of potent antimicrobial agents or adding remedial substances such as color stabilizers and UV-absorbers to the base polymer. The existing efforts require either sacrificing antimicrobial efficacy (such as mixing copper with silver), or incurring additional costs and processing time (such as adding UV-stabilizers and absorbers). Therefore, the existing solutions focus generally on minimizing or remedying the discoloring symptoms.

Hence, there remains a need to come up with a solution to eliminate the fundamental cause of the discoloration problem that exists in polymer compositions containing metal-based antimicrobial agents.

SUMMARY OF THE INVENTION

The present invention provides a process for forming an antimicrobial polymer composition comprising: (a) contacting together at least one initiator, at least one reductant, and at least one monomer, under emulsion polymerization conditions to form a base polymer; and (b) mixing with the base polymer an antimicrobial complex; wherein the at least one initiator is a peroxidic compound and the at least one reductant is an ascorbic compound.

Preferably, the process as described above, further comprising adding at least one promoter during the formation of the base polymer.

Preferably, the process as described above, further comprising adding an oxidant compound, wherein the amount of oxidant compound to be added, by weight percentage based on the dry weight of the antimicrobial polymer composition, is from 0.004 to 10%.

Preferably, the process as described above, wherein the peroxidic compound is tert-butyl hydroperoxide.

Preferably, the process as described above, wherein the ascorbic compound is iso-ascorbic acid.

Preferably, the process as described above, wherein the at least one promoter comprises ferrous II ion.

Preferably, the process as described above, wherein the antimicrobial complex is a metal complexed with a copolymer, wherein the metal is selected from copper, silver, gold, tin, zinc and combinations thereof.

In another aspect of the present invention, a process for forming an aqueous coating composition is provided, the process comprising: dispersing a pigment in an aqueous medium, and combining the pigment with an antimicrobial polymer composition formed according to the process for forming an antimicrobial polymer composition, as described above.

DETAILED DESCRIPTION OF THE INVENTION

One embodiment of the present invention is an antimicrobial polymer composition comprising a base polymer and an antimicrobial complex. The term "complex" as used herein refers to an intimate mixture at the molecular scale, preferably with ionic or covalent bonding between the antimicrobial metal and the anionic polymer. The complex preferably comprises a salt formed between the anionic polymer and metal ions, but it may also comprise metal clusters and/or colloidal metal.

We have observed that the presence of silver salt is one cause for discoloration in antimicrobial polymer composition. Silver salt is highly photo-sensitive and has a strong tendency to change color when comes into contact with sun light. For example, silver nitrate turns black when it comes in contact with sun light, and it is this property that made silver nitrate the preferred base for black and white photographs.

We have further observed that the formation of silver salt in an antimicrobial polymer composition is the result of an ionic reaction between (1) silver ions from the antimicrobial complex and (2) the un-reacted free radicals from decomposed initiators in the base polymer. An initiator is a catalyst used to start the polymerization of a monomer. In the first step of a polymerization process, the initiator is decomposed into free radicals having one or more unpaired electrons. When these free radicals are then mixed with monomers, allowing each free radical to attach itself to a monomer thereby start a new polymer chain. Generally, after a polymerization reaction is completed, there will be a number of free radicals left that were not attached to any monomer.

Traditionally, the emulsion polymer industry favors using initiators that, after decomposed into free radicals, are strong electron donors. For example, the most commonly used initiators are persulfates such as ammonia persulfate. These strong electron donors tend to better attract monomers and thereby form polymer chains faster.

From the perspective of the antimicrobial polymer complex, certain antimicrobial metal ions, such as silver ions, have a strong tendency to bond ionically with electron donors to form silver salt. Therefore, if a silver-based antimicrobial polymeric complex comes into contact with an un-reacted electron donor in the base polymer, then the silver ions in the antimicrobial polymeric complex would detach from the polymeric complex, and instead bond with the electron donor and form silver salt.

Having determined a major cause for the discoloration problem, namely, the unintended formation of metal salt (as a result of salt ions in antimicrobial complex reacting with free radicals in the base polymer), we have surprisingly discovered that the discoloration in an antimicrobial polymer composition is can be drastically reduced by modifying the traditional process of making the base polymer.

Preparation of the Base Polymer in Accordance to One Embodiment of the Present Invention In one embodiment of the present invention, the base polymer, with which the metal-based antimicrobial complex is to be mixed, is prepared via emulsion polymerization. Conventional emulsion polymerization techniques may be used. The practice of emulsion polymerization is discussed in detail by D. C. Blackley, in Emulsion Polymerization (Wiley, 1975) and H. Warson, in The Applications of Synthetic Resin Emulsions, Chapter 2 (Ernest Benn Ltd., London 1972).

From the electro-chemical stand point, there are two types of emulsion polymerization processes: the thermal polymerization and the redox polymerization. For embodiments in accordance to the present invention, the redox polymerization of forming emulsion polymer is used.

Unlike in a thermal polymerization process (where the initiator decomposes by itself to form free radicals), in a redox polymerization process, the redox initiator (sometimes referred to as "oxidants") must work with a reducing agent (sometimes referred to as "reductants") to form the free radicals necessary to be bonded with monomers. Initially, the redox initiator decomposes into free radicals, each of which will attach to a monomer to begin the polymer chain formation. Optionally but preferably, a "promoter" is added to the initiators to accelerate the decomposition of the initiators. In particular, the "promoter" decomposes the redox initiator into a free radical by providing an electron to the initiator; the free radical then reacts with the monomer. The "reductant," on the other hand, recharges the used-up "promoter" with another electron, so that the "promoter" can go back and decompose another redox initiator. Therefore, the redox initiator, the "promoter," and the "reductant" form this continuous cycle of chemical reactions commonly referred to as the "redox system."

The most common "promoter" for the redox system is the ferrous II ion ($Fe^{+2}$). In an aqueous polymerization process, the ferrous ion is generally introduced into the redox system in the form of ferrous sulfate. After supplying the electron to the initiator thereby decomposing the initiator into an electron-carrying free radical, the ferrous II ion loses an electron and becomes a ferrous III ion ($Fe^{+3}$). Common "reductants," such as sodium sulfoxylate formaldehyde, ascorbic acid, isoascorbic acid, metal salts of iron, copper, manganese, silver, platinum, vanadium, nickel, chromium, palladium, or cobalt are used to recharge the ferrous III ion and facilitate the initiation process in redox polymerizaiton.

In one embodiment of the present invention, the collective amount of the three components of the redox system (i.e., the initiator, the "promoter," and the "reductant") to be used in a redox polymerization reaction is generally from about 0.01% to 3%, based on the weight of monomers to be copolymerized.

Specifically, in one embodiment of the present invention, the redox system consists of t-butyl hydroperoxide/isoascorbic acid/Fe(II). The polymerization temperature may be from 10 degree C. to 90 degree C.; more preferably, the polymerization temperature is from 50 degree C. to 90 degree C.

In one embodiment of the present invention, the base polymer is prepared by the polymerization of at least one multi-functional, ethylenically unsaturated monomers. The suitable monomers include styrene, butadiene, alpha-methyl styrene, vinyl toluene, vinyl naphthalene, ethylene, propylene, vinyl acetate, vinyl versatate, vinyl chloride, vinylidene chloride, acrylonitrile, methacrylonitrile, (meth)acrylamide, various C1-C40 alkyl esters of (meth)acrylic acid; for example, methyl(meth)acrylate, ethyl(meth)acrylate, n-butyl(meth)acrylate, 2-ethylhexyl(meth)acrylate, cyclohexyl (meth)acrylate, n-octyl(meth)acrylate, n-decyl(meth)acrylate, n-dodecyl(meth)acrylate, tetradecyl(meth)acrylate, lauryl(meth)acrylate, oleyl(meth)acrylate, palmityl(meth)acrylate, and stearyl(meth)acrylate; other (meth)acrylates such as isobornyl(meth)acrylate, benzyl(meth)acrylate, phenyl(meth)acrylate, 2-bromoethyl(meth)acrylate, 2-phenylethyl(meth)acrylate, and 1-naphthyl(meth)acrylate, alkoxyalkyl(meth)acrylate, such as ethoxyethyl(meth)acrylate, mono-, di-, trialkyl esters of ethylenically unsaturated di- and tricarboxylic acids and anhydrides, such as ethyl maleate, dimethyl fumarate, trimethyl aconitate, and ethyl methyl itaconate; alcohol containing monomers such as hydroxyethyl(meth)acrylate, hydroxypropyl(meth)acrylate, hydroxybutyl(meth)acrylate; carboxylic acid containing monomers, such as (meth)acrylic acid, itaconic acid, fumaric acid, and maleic acid. The term "(meth)acrylate" used here refers to either acrylate or methacrylate and the term "(meth)acrylic" refers to either acrylic or methacrylic.

As mentioned above, typical emulsion polymerization of the monomers for the base polymer is "kicked-off" by the addition of the redox system comprising an initiator, a promoter, and a reductant. The components of the redox system may be added to the reaction vessel together prior to the monomer addition, concurrent with the monomer addition, or after the monomer addition. Alternatively, the components of the redox system may be added to the reaction vessel separately before, during, or after the monomer addition.

Suitable redox polymerization initiators for the redox system, in accordance with one embodiment of the present invention, include chemical compounds that have peroxidic components (i.e., peroxidic compounds). For example, peroxidic compounds such as hydroperoxides, such as t-butyl hydroperoxide and cumene hydroperoxide; peroxides, such as benzoyl peroxide, caprylyl peroxide, di-t-butyl peroxide, ethyl 3,3'-di-(t-butylperoxy)butyrate, ethyl 3,3'-di(t-amulperoxy)butyrate, t-amylperoxy-2-ethyl hexanoate, and t-butylperoxy pivilate; peresters, such as t-butyl peracetate, t-butyl perphthalate, and t-butyl perbenzoate; as well as percarbonates, such as di(1-cyano-1-methylethyl)peroxy dicarbonate; and perphosphates, can be used as initiators for purposes of this invention.

As mentioned above, the suitable redox polymerization reductant, in accordance with one embodiment of the present invention, is an ascorbic compound such as ascorbic acid or iso-ascorbic acid.

Promoters such as chloride and sulfate salts of cobalt, iron, nickel, and copper are generally used in small amounts.

The chemical reactions that occur in the redox polymerization process in accordance with one embodiment of the present invention will now be explained. In one particular embodiment of the present invention, a peroxidic compound, such as hydroperoxide ($H_2O_2$), is used as the initiator for forming the base polymer under redox polymerization conditions.

Initially, a promoter, such as the ferrous II ion ($Fe^{+2}$) is mixed with the peroxidic compound. When mixed, the promoter ferrous II ion provides an electron to the peroxidic initiator compound, thereby "decomposing" the peroxidic initiator compound into two molecules each containing a hydroxyl group (i.e., a chemical molecule with an $OH^-$ ending). At the meantime, the promoter ferrous II ion now becomes ferrous III ion ($Fe^{+3}$), due to the loss of an electron to the peroxidic compound.

Thereafter, iso-ascorbic acid ($C_6H_8O_6$) was added to the mixture as a reductant. The iso-ascorbic acid molecule breaks off one two hydrogen atoms, and donates one electron to the ferrous III compound, thereby converting the ferrous III ion back to ferrous II ion. In the process, the two hydrogen atoms that were broken off from the iso-ascorbic acid attach to the hydroxyl group of the peroxidic initiator compound to form a water molecule.

In sum, in this embodiment of the present invention, because the hydroxyl group from the decomposed peroxidic initiator compound reacts readily with the two hydrogen atoms from the iso-ascorbic acid reductant to form water, the decomposed peroxidic initiator does not, and cannot, react with any silver ion in the antimicrobial polymer complex to form silver salt.

In addition to the components of a redox system that is required to "kick off" the redox polymerization process, in one embodiment of the present invention, the redox polymerization reaction is advantageously carried out in the presence of one or more suitable surfactants (also referred to as "emulsifiers.") One or more surfactants, including anionic or nonionic surfactants, or mixtures thereof, are commonly used. Many examples of surfactants suitable for emulsion polymerization are given in McCutcheon's Detergents and Emulsifiers (MC Publishing Co. Glen Rock, NF), published annually.

In one embodiment of the present invention, a monomer emulsion containing all or some portion of the monomers to be polymerized may be first prepared using the monomers, water, and surfactants. A catalyst solution containing one, two, or all three components of the redox system may be separately prepared.

The monomer emulsion and catalyst solution(s) may be co-fed into the reaction vessel over the course of the emulsion polymerization. The reaction vessel itself may initially contain water. The reaction vessel may also additionally contain seed emulsion and further may additionally contain an initial charge of the polymerization catalyst. The temperature of the reaction vessel during the emulsion polymerization may be controlled by either cooling to remove heat generated by the polymerization reaction, or by heating the reaction vessel, or a combination as required. Several monomer emulsions may be simultaneously into the reaction vessel. When multiple monomer emulsions are fed, they may be of the same or different monomer compositions. The sequence and rates at which the different monomer emulsions are fed may be altered during the emulsion polymerization process. The pH of the contents of the reaction vessel may also be altered during the course of the emulsion polymerization process.

In one embodiment of the present invention, antimicrobial polymer composition of the present invention comprises an oxidant compound as additive. The amount of oxidant compound to be added, by weight percentage based on the dry weight of the emulsion, ranges from 0.004 to 10%, preferably from 0.05 to 2%, and more preferably from 0.1 to 2%, and even more preferably from 0.2 to 2%. Examples of suitable oxidants can be used in this embodiment of the present invention include peroxides such as, for example, peroxide hydrogen, benzoyl peroxide, tert-butyl hydro peroxide, di-tert-butyl hydro peroxide, tert-butyl peroxy benzoate and tert-butyl peroxy-2-ethyl-hexanoate; halogen acids such as, for example, chloric acid, bromic acid and iodic acid; hypohalous acid such as, for example, hypochlorous acid, hypobromous acid and hypoiodus acid; halousacid such as, for example, chlorous acid; perhalogen acid such as, for example, perchloric acid, perbromic and periodic acid; and their lithium, sodium and calcium salts such as, for example, lithium perchlorate, potassium chlorate, sodium chlorite, potassium bromate, sodium iodate, sodium hypochlorite, calcium chlorate and calcium iodate; and the combinations thereof.

In one embodiment of the present invention, the glass transition temperature (Tg) of the base polymer ranges from −35° C. to 60° C., preferably from −15° C. to 40° C., and more preferably from −10° C. to 30° C. Tgs used herein are those calculated by using the Fox equation (T. G. Fox, *Bull. Am. Physics Soc.*, Volume 1, Issue No. 3, page 123, 1956). Tgs of homopolymers may be found, for example, in "*Polymer Handbook,*" edited by J. Brandrup and E. H. Immergut, Interscience Publishers.

Preparation of the Antimicrobial Complex

In addition to the base polymer described above, the antimicrobial polymer composition of the present invention further comprises, by weight percentage based on the dry weight of the emulsion, from 0.002 to 1%, preferably from 0.003 to 1%, more preferably from 0.02 to 0.5%, a metal complexed with a copolymer, wherein the metal is selected from copper, silver, gold, tin, zinc and combinations thereof. In one embodiment of the present invention, the metal is silver.

Silver is especially potent as an antimicrobial metal against a broad spectrum of microorganisms. Preferably, the source of the antimicrobial metal in the complex with the anionic polymer is elemental silver, silver alloys, a silver compound or mixtures thereof. The silver compound referred to herein is a compound comprising a silver ion, linked to another molecule via a covalent or non-covalent linkage.

As used herein and in the appended claims, the term "metal complexed with polymer" herein refers to a metal which is complexed with a copolymer via coordination bond, ion bond or other weak interactions. The content of a "metal complexed with polymer" in a composition of the present invention refers to the content of the metal. The term "silver" herein refers to silver metal that is incorporated into an antibacterial emulsion or composition of the present invention.

While not wanting to be bound as to the oxidation state of the silver ($Ag^0$, $Ag^{1+}$), that is incorporated into the antibacterial emulsion or composition, silver may be added to the antibacterial emulsion or composition by washing the copolymer in a silver solution such as silver nitrate in deionized water ("DI"). Aside from DI, other liquid mediums can also be used such as water, aqueous buffered solutions and organic solutions such as polyethers or alcohols. Other sources of silver include but are not limited to silver acetate, silver citrate, silver iodide, silver lactate, silver picrate and silver sulfate. The concentration of silver in these solutions can vary from the concentration required to add a known quantity of silver to the antibacterial emulsion or composition to a saturated silver solution.

Other components may be added to the polymer composition of this invention, including without limitation, other polymers such as vinyl acetate polymers, styrene butadiene polymers, acrylic copolymers, and vinyl chloride copolymers; other pigments or fillers; surfactants; plasticizers; buffers; neutralizers; humectants; waxes; dyes; pearlescents; adhesion promoters; tackifiers; dispersants; defoamers; leveling agents; optical brighteners; ultraviolet stabilizers such as hindered amine light stabilizers; cosolvents; coalescents; rheology modifiers or thickeners; preservatives; biocides; and antioxidants.

Incorporation into a Paint Formulation

The aqueous coating composition of this invention is contemplated to encompass coating or paint compositions which may be described in the art as high gloss, gloss, semi-gloss, low gloss or flat coatings, primers, textured coatings, and the like. The aqueous coating composition is prepared by techniques which are well known in the coatings art. See, for example, U.S. Pat. No. 5,385,960.

First, optionally, at least one pigment is well dispersed in an aqueous medium under high shear such as is afforded by a COWLES mixer or, in an alternative, at least one predispersed pigment may be used.

Then the aqueous antimicrobial polymer composition of the present invention is added into the pigment dispersion under low shear stirring along with other coatings adjuvants, as desired. The conventional coating adjuvants are, for example, tackifiers, emulsifiers, coalescing agents such as for example, TEXANOL™ (Eastman Chemical Co.), co-solvents such as, for example, glycols and glycol ethers, buffers, neutralizers, thickeners or rheology modifiers, humectants, wetting agents, biocides, plasticizers, antifoaming agents, colorants, waxes, and anti-oxidants.

The solid content of the resultant aqueous coating composition may be from about 10% to about 70% by volume. The viscosity of the aqueous coating composition may be from 0.05 to 30 Pa (50 cps to 30,000 cps), as measured using a Brookfield viscometer; the viscosities appropriate for different application methods vary considerably.

The aqueous coating composition may be applied by conventional application methods such as, for example, brushing, roller application, and spraying methods such as, for example, air-atomized spray, air-assisted spray, airless spray, high volume low pressure spray, and air-assisted airless spray.

The antibacterial polymer emulsion of the present invention may be used in a variety of materials to provide a persistent, antibacterial activity with low discoloration level upon exposure to light and/or heat The materials include, for example, plastics, emulsions, dispersions, paints, latices, coatings, construction products (such as mastics, caulks and sealants), construction adhesives (such as ceramic adhesives, carpet backing adhesives, and laminating adhesives), industrial or consumer adhesives, photographic chemicals, printing fluids, household products (such as bathroom disinfectants or sanitizers), cosmetics and toiletries, shampoos, soaps, detergents, industrial disinfectants or sanitizers (such as cold sterilants and hard surface disinfectants), floor polishes, laundry rinse water, metalworking fluids, conveyor lubricants, hydraulic fluids, leather and leather products, textiles, textile products, wood and wood products (such as plywood, chipboard, flakeboard, laminated beams, oriented strandboard, hardboard and particleboard), petroleum processing fluids, fuel, oilfield fluids (such as injection water, fracture fluids and drilling muds), agricultural adjuvant preservation, surfactant preservation, diagnostic reagent preservation and filtration media.

Test Procedures

The following test procedures were used to generate the data reported in the Examples below.

The light stability of the antibacterial coating composition was tested by measuring the individual values of Hunter L, a, b and L*, a*, b* (CIELAB) before and after exposure of the dry coating film to the sun light or UV for at least 1 week. Prepared the latex film and the coating film according to Chinese Standard GB/T 1727 and dried at 25° C. and 50% relative humidity (RH) for at least 7 days. The dry film were exposed outdoor and near window in house (where sunlight can directly reach through glass) and UV for at least 1 week.

EXAMPLES

The following examples are for illustrative purposes only and are not intended to limit the scope of the invention.

Example 1—Preparation of Aqueous Emulsion Polymer in Accordance with One Embodiment of the Present Invention I. Starting Materials The chemicals listed in Table 1 below were used in the formulation of a sample antimicrobial polymer composition, as one embodiment in accordance with the present invention:

TABLE 1

List of Raw Materials Used to Make the Emulsion Polymer in Example 1

| Chemical | Function |
|---|---|
| Sodium dodecyl benzene sulfonate (DISPONIL FES 32) | Emulsifier/Surfactant |
| Rhodafac RS-610 S-25 | Surfactant |
| Ammonia | Buffer |
| 0.2% Ferrous Sulfate | Promoter |
| 1% Ethylene Diamine Tetraacetic Acid | Chelator |
| Tert-Butyl Hydroperoxide (t-BHP) at 70% Concentrate | Initiator |
| Isoascorbic Acid | Reductant |
| Methyl Methacrylate (MMA) | Monomer |
| (Meth)acrylic Acid (MAA) | Monomer |
| Acrylamide | Monomer |
| Hydrogen Peroxide (at 30% concentrate) | Oxidant |
| Silver ion complex with polyimidazole (SilvaDur ™) | Antimicrobial Polymer Complex |

II. Preparation of Aqueous Emulsion Polymer in Example 1

The preparation of an aqueous antimicrobial polymer composition in accordance to one embodiment of the present invention can in principle be carried out using a conventional continuous or discontinuous processes of free-radical emulsion polymerization. The polymerization may be conducted with the assistance of customary reaction vessels such as loop or stirred reactors. Preference is given to using discontinuous processes such as batch, combined batch/feed stream, pure feed stream processes or feed stream processes onto nucleating particles. Particular preference is given to a pure monomer feed stream process.

The following example illustrates the process of the invention. Where not otherwise specified throughout the specification and claims, temperatures are given in degrees centigrade and parts, percentages and proportions are by weight.

First, a monomer mixture was prepared by mixing in 324.69 g of DI water, 60.80 g of AM, 32.99 g of MAA, 798.20 of BA, 771.51 of MMA, and 101.16 of Rhodafac RS-610 S-25 surfactant.

Then, in a one gallon vessel equipped with a reflux condenser and a stirrer, 854 g of DI water was added at an agitation rate of 130 RPM. The reactor temperature was raised to 78 degree C. at the same time. Then 5.07 g of DISPONIL FES 32 surfactant, along with a buffer solution consists of 3.50 g of ammonia and 5 g of DI water were introduced into the reaction vessel.

Thereafter, 89.0 g of the monomer mixture, an initial reductant solution consists of 10.5 g of Ferrous Sulfate and 13.40 g of Ethylene Diamine Tetraacetic Acid, a secondary reductant solution consists of 0.45 g of isoascorbic acid and 10.52 g of DI water, and an initiator solution consists of 0.69 g t-BHP and 10.52 g of DI water, were injected into the reaction vessel. The reaction mixture was being held at a temperature between 72 and 80 degree C. for 10 minutes. Thereafter, the remainder of the monomer mix was added into the reaction vessel over the span of 270 minutes.

Then another shot of initiator solution consists of 3.48 t-BHP and 160 g DI water, and a second reductant solution consists of 2.3 isoascorbic acid and 160 g of DI water, were injected into the reaction vessel. The reaction temperature is being held at somewhere between 74 to 76 degree C.

After the above mixing steps have been completed, the cooling of the reaction vessel can begin. While cooling the contents of the reactor to room temperature, a mixture of 0.93 g of t-BHP in 28 g of DI water, and 0.6 g of isoascorbic acid in 29 g of water were added when the temperature had dropped to 65 degree C. Thereafter, a mixture consists of 2.96 g hydrogen peroxide and 6 g of DI water (oxidant) were added to the reaction vessel when the temperature had reached 50 degree C. An adjustable amount of ammonia solution was added to the resultant emulsion polymer to keep the pH at between 8.5 and 9.5.

Finally, when temperature has dropped to 45 degree C., a mixture consists of 33.71 g of the antimicrobial polymer complex SilvaDur ET and 34.75 g of surfactant TERGITOL was injected into the reactor over a span of 60 minutes.

Example 2—Preparation of Aqueous Emulsion Polymer in Accordance with a Second Embodiment of the Present Invention An aqueous antimicrobial polymer composition was prepared as described in Example 1 above, except that instead of adding t-BHP as initiator, hydrogen peroxide ($H_2O_2$) was added as an initiator. In this particular example, 3.22 grams of hydrogen peroxide (with 30% concentration) was used.

Example 3—Comparative Example

An aqueous antimicrobial polymer composition was prepared as described in Example 1 above, except that instead of adding a peroxidic compound as initiator, ammonia persulfite (APS) was used as an initiator. In this particular example, 7.62 grams of APS (with 97% concentration) was used.

Example 4—Preparation of Aqueous Coating Composition in Accordance with One Embodiment of the Present Invention I. Starting Materials The materials listed in Table 3 below were used to formulate a paint incorporating the antimicrobial polymer composition as an embodiment in accordance to the present invention.

TABLE 2

List of Raw Materials Used to Make the Aqueous Coating Composition In Accordance with One Embodiment of the Present Invention

| Material | Weight(g) |
|---|---|
| Grind | |
| Water | 210.0 |
| Propylene glycol | 10.0 |
| AMP-95 ™ | 1.0 |
| Orotan ™ 731A | 2.5 |
| Dispelair ™ CF-246 | 1.0 |
| Ti-Pure ™ R-706 | 216.0 |
| CC-1000 | 68.0 |
| Letdown | |
| Example 1 | 450.0 |
| Acrysol ™ RM-2020NPR | 10.0 |
| Dispelair ™ CF-246 | 1.0 |
| Texanol ™ | 20.0 |
| Acrysol ™ RM-8W | 3.3 |
| Water | 5.5 |
| Total | 1000.0 |

II. Preparation of Aqueous Coating Composition in Examples 4

Paint composition in Example 5, which contains antimicrobial emulsion polymer Example 1, was prepared using the following process. The ingredients listed in Table 3's "Grind" section were mixed using a high speed Cowles disperser. The ingredients listed in Table 3's "Let Down" section were added using a conventional lab mixer. The pigment volume concentration (PVC) of the resulting paints was 30%. The volume solids of the resulting paint was 34.4%. And the weight solids was 49.6%.

Paint compositions in Examples 4, 5, and 6, which contain antimicrobial emulsion polymers Example 1, 2 and 3, respectively, were also prepared using the above process.

Results

After preparing the dry films of the antimicrobial polymer compositions in Examples 1 to 3 using the process described above, the degree of discoloration of each polymer composition was measured immediately, and after 10 days of sunlight exposure. The data in Table 3 below demonstrates that Examples 1 and 2, the dry1 films of the antimicrobial polymer composition made according to the two embodiments of the present invention, exhibit significantly better color stability over Example 3. That is, an antimicrobial polymer composition containing a base polymer made using peroxidic compounds as initiators and iso-ascorbic acid as reductant, has significantly better color stability over an antimicrobial polymer composition containing a base polymer made using non-peroxidic compound as initiator.

TABLE 3

Dry Film Discoloration Comparison of Antimicrobial Polymer Composition Examples 1 to 3

| Time | Example 1 | Example 2 | Example 3 |
| --- | --- | --- | --- |
| Immediately | 3.93 | 3.83 | 3.93 |
| 10 days | 3.5 | 4.57 | 8.46 |
| Index of discoloration ($\Delta b$ Value) | −0.43 | 0.74 | 4.53 |

Table 4 below compares the discoloration values for paint compositions in Examples 4-6, which incorporate antimicrobial polymer compositions Examples 1 to 3, made using the process described above.

TABLE 4

Dry Film Discoloration Comparison of Paint Compositions Containing Antimicrobial Polymer Composition Examples 4 to 6

| Time | Example 4 | Example 5 | Example 6 |
| --- | --- | --- | --- |
| Immediately | 1.45 | 0.66 | 0.53 |
| 10 Days | 2.00 | 1.22 | 2.18 |
| Index of discoloration ($\Delta b$ Value) | 0.55 | 0.56 | 1.65 |

As can be seen from the above table, the paint compositions Examples 4 and 5, which contain the antimicrobial polymer compositions Examples 1 and 2, show superior color stability over time, as compared to paint composition Example 6.

What is claimed is:

1. A process for forming an antimicrobial polymer composition comprising: (a) contacting together at least one initiator, at least one reductant, and at least one monomer, under emulsion polymerization conditions to form a base polymer; and (b) mixing with the base polymer an antimicrobial complex; wherein the at least one initiator is a peroxidic compound and the at least one reductant is an ascorbic compound.

2. The process of claim 1, further comprising adding at least one promoter during the formation of the base polymer.

3. The process of claim 1, further comprising adding an oxidant compound, wherein the amount of oxidant compound to be added, by weight percentage based on the dry weight of the antimicrobial polymer composition is from 0.004 to 10%.

4. The process of claim 1, wherein the peroxidic compound is tert-butyl hydroperoxide.

5. The process of claim 1, wherein the ascorbic compound is iso-ascorbic acid.

6. The process of claim 2, wherein the at least one promoter comprises ferrous II ion.

7. The process of claim 1, wherein the antimicrobial complex is a metal complexed with a copolymer, wherein the metal is selected from copper, silver, gold, tin, zinc and combinations thereof.

8. A process for forming an aqueous coating composition comprising: (a) dispersing a pigment in an aqueous medium, (b) combining the pigment with a antimicrobial polymer composition formed according to the process in claim 1.

* * * * *